Patented Aug. 25, 1936

2,052,435

UNITED STATES PATENT OFFICE 2,052,435

TREATMENT OF RUBBER

George M. Wright, Akron, Ohio, assignor to Wingfoot Corporation, Wilmington, Del., a corporation of Delaware No Drawing. Application April 2, 1934, Serial No. 718,686

7 Claims. (Cl. 260—1)

This invention relates to the treatment of rubber in solution with a compound of an amphoteric metal in the presence of water. It involves the removal of the water from the mixture by heating, preferably by means of a water trap connected with a reflux condenser situated over the heated rubber solution.

It is known that rubber derivatives having very different properties from rubber can be obtained by treating rubber with compounds of amphoteric metals. It appears that by heating the rubber with such compounds the metal adds onto the rubber and then by splitting off the metal a condensation derivative of rubber is formed. Such a series of reactions can be carried out using halides of such amphoteric metals as tin, iron, bismuth, chromium, etc. A somewhat different end product is obtained if the reaction is carried out in the presence of an acid such as hydrochloric acid. If the reaction is carried out with a hydrated compound such as hydrated tin tetrachloride or in the presence of any aqueous material such as a water solution of hydrochloric acid or if a compound such as hydrated chlorostannic acid is employed the water present in the reaction mixture retards the progress of the reaction. This invention relates to the removal of water from such a reaction mixture during the reaction in which the solution is heated.

When the solution is heated the solvent and water are vaporized. If the reaction is carried out at the boiling point of the mixture the water is rapidly vaporized. A reflux condenser is so connected with the reaction vessel that the condensate of water and solvent passes through a water trap and the water or at least a large portion of the water is collected in the trap and prevented from returning to the reaction mixture. The presence of water in the reaction mixture tends to retard the progress of the reaction, probably due to hydrolysis of the compound of the amphoteric metal. By preventing the return of water to the reaction mixture such hydrolysis is minimized and the reaction accelerated.

In certain reactions such as the reaction of rubber with hydrated chlorostannic acid ($H_2SnCl_6.6H_2O$) the progress of the reaction may be determined by measuring the amount of water recovered in the water trap. The extent to which the rubber is changed during the reaction varies with the amount of water eliminated and by measuring the amount of the water recovered in the trap the progress of the reaction may be determined. The reaction may be stopped when a product of lower softening point and higher viscosity is obtained or the reaction may be carried further to produce a product of higher softening point and lower viscosity. In this manner products suitable for molding or for solution in solvents for the production of paints and adhesives, etc. may be produced.

For example, pale crepe rubber plasticized to a plasticity of about 300 as measured by a Williams plastometer is dissolved in sufficient benzene to produce a 10% solution. This is heated with 10% of crystalline chlorostannic acid ($H_2SnCl_6.6H_2O$) based on the weight of the rubber in the solution. The reaction may advantageously be carried out in a Day mixer equipped with a reflux condenser in which there is a water trap to collect the water in the condensate so that the condensed solvent returned to the reaction mixture is more or less free from water condensed on refluxing. The reaction mixture is heated at the boiling point for several hours. During the early stages of the reaction a large amount of water is vaporized and this gradually decreases as the heating is continued. If the reaction is standardized so that a standard amount of each reagent is employed the progress of the reaction may be determined by the amount of water collected in the water trap. The reaction is continued until a product of desired properties is produced. For example, a product may be obtained which on quenching in a large volume of water and removal of the solvent by steam distillation will give a material which can be molded at about 260 degrees F.

Instead of benzene other solvents which are immiscible with water, such as gasoline and chloroform may be employed. If a solvent of lower gravity than water is employed the water trap will be designed to remove the condensate of higher gravity. If a solvent of greater gravity than water is employed the water trap will be designed to remove the condensate of lower gravity.

Similarly if anhydrous ferric chloride and aqueous hydrochloric acid are employed or other halide of an amphoteric metal is used with an aqueous acid or a hydrated salt of an amphoteric metal is utilized in the reaction mixture, the reaction may be accelerated by the removal of water from the condensate in the reflux apparatus.

What I claim is:

1. In the method of forming condensation derivatives of rubber by treating rubber in solution in the presence of water with a condensing agent which is a halide of an amphoteric metal, the steps which comprise heating the mixture to vaporize solvent and water, removing water from the mixture of water and solvent vaporized and returning to the heated reaction mixture, solvent from which the removed water has been separated.

2. In the method of forming condensation derivatives of rubber by treating rubber in solution with a halide of an amphoteric metal in the presence of water, the steps which comprise heating the mixture to vaporize water and solvent, condensing water and solvent vaporized from the solution, separating water from the mixed condensate and returning to the reaction mixture condensate from which the water has been separated.

3. In the method of forming condensation derivatives of rubber by treating rubber in solution with a condensing agent which is a halide of an amphoteric metal and an aqueous solution of hydrochloric acid, the steps which comprise heating the solution of rubber and condensing agent to vaporize water and solvent, condensing water and solvent vaporized from the solution, removing condensed water from the condensate and returning to the reaction mixture condensate from which the removed water has been separated.

4. In the method of forming condensation derivatives of rubber, the steps which comprise boiling a solution of rubber with a halide of an amphoteric metal in the presence of water under a reflux condenser, condensing water and solvent from the vapors evolved from the solution, trapping out water from the condensate and returning the balance of the condensate to the boiling solution.

5. In the method of forming condensation derivatives of rubber, the steps which comprise boiling a solution of rubber with a condensing agent which is a hydrated acid which contains an amphoteric metal, condensing water and solvent from the vapors evolved from the solution, trapping out water from the condensate and returning the balance of the condensate to the boiling solution.

6. In the method of forming condensation derivatives of rubber, the steps which comprise boiling a solution of rubber with chlorostannic acid containing water, condensing water and solvent from the vapors evolved from the solution, trapping out water from the condensate and returning the balance of the condensate to the boiling solution.

7. In the method of forming condensation derivatives of rubber by treating rubber in solution in the presence of water with a condensing agent which is a halide of an amphoteric metal, the steps which comprise heating the solution to vaporize water therefrom and eliminating from the distillation zone water which has been thus vaporized.

GEORGE M. WRIGHT.